United States Patent [19]

Maiocchi

[11] 4,085,787

[45] Apr. 25, 1978

[54] PNEUMATIC TIRE FOR A VEHICLE HAVING A RADIAL CARCASS AND IMPROVED BEADS

[75] Inventor: Luigi Maiocchi, Milan, Italy

[73] Assignee: Industrie Pirelli S.p.A., Milan, Italy

[21] Appl. No.: 704,580

[22] Filed: Jul. 12, 1976

[30] Foreign Application Priority Data

Jul. 23, 1975 Italy .................................. 25657 A/75

[51] Int. Cl.² ............................................. B60C 15/06
[52] U.S. Cl. ............................. 152/362 R; 152/354 R; 152/374
[58] Field of Search ................ 152/362 R, 353 R, 354, 152/355, 357, 374

[56] References Cited

U.S. PATENT DOCUMENTS

| | | | |
|---|---|---|---|
| 3,557,860 | 1/1971 | Maiocchi | 152/362 R |
| 3,612,138 | 10/1971 | Ravenhall | 152/354 |
| 3,964,533 | 6/1976 | Arimura et al. | 152/362 R |

*Primary Examiner*—Drayton E. Hoffman
*Attorney, Agent, or Firm*—Stevens, Davis, Miller & Mosher

[57] ABSTRACT

A pneumatic tire for a vehicle wheel using a flanged rim has a bead structure which provides for a gradual decrease in rigidity between the area of the bead and the sidewall of the tire. The bead has an annular wire, at least one ply of the carcass wound about the wire and extending axially therefrom into the sidewall of the tire and a rubber filler filling the space between the turned-up portion of the ply and that portion on the opposite side of the annular wire. An annular fabric member is disposed over the turned-up portion of the carcass ply and extends beyond the end of the carcass ply into the sidewall of the tire. The rigidities of the metallic fabric and of the filler are balanced against each other so that the rigidity in the bead area of the tire gradually decreases from the bead into the sidewall of the tire. The filler is rubber having a Shore A hardness between 70° and 80° or 100% modulus between 65 and 85 kg/cm². The metallic fabric has its cords disposed in a high elongation lang lay. The metallic cords in the fabric are disposed at an angle of between 15° and 45° with respect to the circumferential direction of the tire. Preferably the metallic fabric has about 4½ cords per cm.

9 Claims, 3 Drawing Figures

U.S. Patent      April 25, 1978      4,085,787
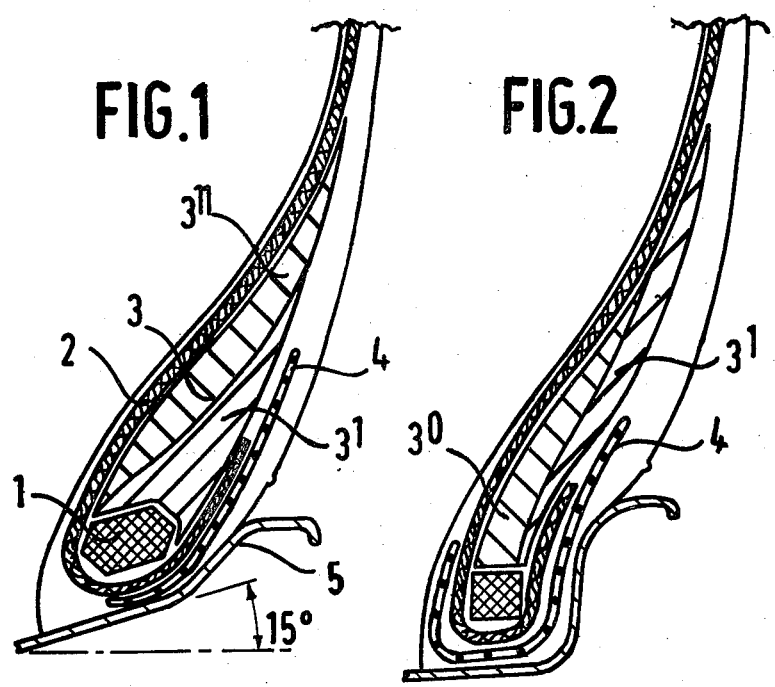
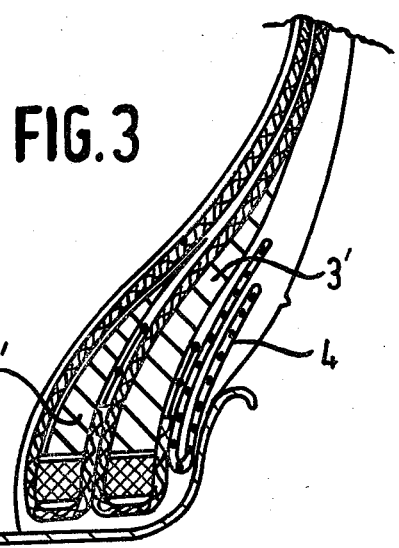

PNEUMATIC TIRE FOR A VEHICLE HAVING A RADIAL CARCASS AND IMPROVED BEADS

The present invention relates to pneumatic tires for vehicle wheels and, in particular, it relates to a tire provided with a radial carcass (i.e. with a carcass having cords which are arranged on meridian planes or which at the most form small angles with the planes), and more specifically, it relates to pneumatic tires of this type adapted to be used on heavy automotive transports.

It is known that the sidewalls of radial carcass tires are very flexible and are therefore very deformable in the vertical direction when under load action.

On the other hand, the tire's bead must be rigid in order to assure good driving and behavior properties of the tire with the rigidity being greater as the load on the tire under actual use conditions increases, such as in the case of heavy automotive transports.

Strips of cord fabric arranged in the axially external area of the bead are used to increase the rigidity of the bead. These strips of cord fabric may extend in various ways from a radially internal area of the bead cores up to a certain height beyond the area corresponding to the rim flange on the rim upon which the tire will be mounted.

By "axially external area of bead" is meant, herein, the area which, in tires having carcass fabric plies which are turned around the bead cores towards the exterior, is disposed between the carcass ply turn-up and the bead external surface, facing the rim flange.

With such an arrangement the very flexible area of the sidewall of the tire passes directly into a very rigid area provided by the bead instead of passing gradually from flexible to rigid areas. In other words the change from the flexible to rigid occurs in a discontinuous manner with an abrupt variation at the radially external end of the reinforcement.

For this reason, the repeated flexing of the tire while in use along with the conditions to which the sidewalls are subjected cause rapid deteriorations in the area disposed between the area facing the rim flange and the point at which the tire section has its maximum width. Such deteriorations are generally of two kinds, depending upon the type of reinforcements employed. With relatively rigid cord fabric (reinforcing fabric with cords of regular lay, namely those in which the elementary wires forming the strand and the strands forming the cord are wound in opposite senses instead of in a "lang lay" wound in the same sense), breaking of the bead is caused by cords becoming detached from the surrounding rubber in radially external areas of the strings because of the unavoidable rigidity difference between the metallic fabric and surrounding rubber and because of stresses acting on the cords which, just because of the rigidity, are subjected to a buckling load. Once started, such separation of the cord from rubber continues, increasingly in the direction of stress, until it causes the bead to be destroyed.

On the other hand, with a rather flexible cord fabric, the bead is also more flexible. Thus, the discontinuity between flexing rigidity of the rubber and of the reinforcement is remarkably attenuated and the buckling load on the cord ends no longer occurs, wherefore, under conditions of normal use generally good results are obtained. However, in cases of heavy use, another problem does arise because the greater flexibility of the tire as a whole gives rise to more important deformations which cause the reinforcement cords to break, due to flexing fatigue, at about the rim flange level.

It is an object of the present invention to provide a radial carcass pneumatic tire, specifically adapted for use on heavy automotive transports, whose bead combine the advantages of both of the above known solutions reported above but at the same time avoid the disadvantages thereof and the damages which result therefrom.

Other objects will become apparent from the following description with reference to the accompanying drawing wherein FIG. 1 is a cross section of the bead portion of a radial carcass tire of the tubeless type;

FIG. 2 is a cross section of the bead portion of a radial tire having a single carcass metallic ply; and FIG. 3 is a cross section of the bead portion of a radial tire having two bead cores and a textile carcass ply.

The foregoing objects and others are accomplished in accordance with this invention by providing a pneumatic tire for a vehicle wheel having a radial carcass in which each bead has at least a bead core of metal wires, carcass fabric plies which are turned up around the bead core, a filler having an approximately triangular elongated section of high rigidity rubber arranged on each bead core and at least one reinforcement element arranged in the axially external area of the bead in the form of a cord fabric strip radially extending from a point approximately located at the bead core height to an external point opposite the flange of the rim and to the end of the turned up portion of the carcass ply, characterized in that it has, in combination with each other, the following features:

the filler being, at least in its portion facing the reinforcement, a compound selected among those having hardness characteristics between 70° and 80° Shore A and/or a modulus at 100% between 65 and 85 kg/cm$^2$, the reinforcement being of metallic cord fabric with high elongation lang lay cords, the rigidity of the reinforcement being determined by the number of cords per cm in the fabric and the angle at which they are with respect to circumferential direction of the tire, the inclination angle being between 15° and 45°; and the number of cords per cm being between three and seven, the rigidity of the filler as a whole and the rigidity of the reinforcement being so combined with each other, that they originate a bead having a constant rigidity gradient, i.e., a variable rigidity from point to point in a substantially continuous manner. The expression "high elongation lang lay cords" is used to identify without any equivocation possibility the class of metallic cords which are referred to; i.e. those in which the elementary wires forming the strand and the strands forming the cord are wound in the same direction and with a short winding pitch, from which it ensues that for such cords traction breaking load elongation is very high with respect to that of other metallic cords (8% against 3%). Further the winding pitch for the elementary wires forming the strands is between 15 and 5 mm and the winding pitch for the strands forming the cords is between 10 and 4 mm.

It has been found that it is very advantageous to use as reinforcement a metallic cord fabric with 3 × 7 × 0.20 high elongation lang lay cords (three strands, each of seven elementary wires, wire diameter 0.20 mm, strands and cord being twisted in the same direction, with a winding pitch for the elementary wires in a strand of 10 mm and with a winding pitch for the strands in a cord of 6.3 mm elongation breaking of 8% with 4.5 cords per cm., arranging it with the cords inclined at a 30° angle to the circumferential direction of the tire, and combining it with a rubber sheet having a 75° Shore hardness. The Shore hardness values referred to herein are Shore A.

The reinforcement extends radially beyond the flange of the rim up to a height of about 1/5 of the tire section height.

In the lower radial position, the reinforcement can wrap around the bead core rising up to a radially external point with respect to the bead core in an axially internal position.

According to a first embodiment of the invention which has shown to be especially of advantage for tubeless tires which are to be mounted on rims with a bead seat inclined at 15° and for lowered tires of both series 70 and 80 (i.e. ratio between height and tire section maximum width of 0.7 and 0.8, respectively) which do notoriously require more flexible beads, the filler of the bead core consists of two elongated section rubber sheets arranged side by side, where the sheet contacting the bead core and facing the reinforcement has, as already said, a hardness of 75° Shore, and the sheet facing the carcass fabric plies has, on the contrary, a 60° Shore hardness.

According to another embodiment which, on the other hand, has proved to be very convenient for pneumatic tires with single metallic carcass ply, which are to be mounted on flat or 5° inclined bead seat rims, the filler consists of two elongated section rubber sheets arranged side by side, where the sheet contacting the bead core and facing the carcass radial ply has a 90° Shore hardness, and the sheet facing the reinforcement has a 75° Shore hardness and, or alternatively, a modulus at 100% between 65 and 85 kg/cm$^2$.

In accordance with a third version which has given very favorable results on tires having double-bead cores and textile carcass plies, both fillers arranged on the bead cores are rubber sheets having a 75° Shore hardness, whereas reinforcement is double, being formed by a strip of the cord fabric folded up on itself with the fold corresponding to the radially internal area; the sheets may have, or alternatively have a modulus at 100% between 65 and 85 kg/cm$^2$.

Referring now to the drawing, the bead portion of a tubeless radial tire is illustrated in FIG. 1. The bead has a hexagonal bead core 1 made of wire. The end of a single metallic cord ply of carcass 2 is turned around bead core 1. A filler 3 is arranged on bead core 1 and the turned-up portion of the carcass ply lies on the filler 3.

A reinforcing element 4 is arranged in an axially external position to bead core 1, i.e., externally to the turned-up portion of the carcass ply 2 and to the filler 3.

The bead lies against a rim section having a rim flange 5.

As known to those skilled in the art, the bead of such a tire, as well as the one of the so called series 70 and 80 tires, should be more flexible than the one used for normal tires.

It has been found surprisingly that it is possible to assign the most appropriate rigidity value range to these beads, to provide for such values to vary gradually point by point from the flexible end of the sidewalls to the bead base without any abrupt discontinuity by combining with a rubber filler of high rigidity such as that showing a hardness between 70° and 80° Shore and at the same time, or alternatively, a modulus at 100% between 65 and 85 kg/cm$^2$, a metallic fabric reinforcement with highly flexible cords, such as those formed by a few strands each of many elementary wires, all of them twisted in the same direction, with very short pitches and, therefore, having a high elongation.

The necessary rigidity of this reinforcement is obtained by way of increasing the number of cords per cm with respect to usual values (3.5 cord/cm with cords 7 × 3 × 0.18 of regular lay), thus obtaining fabrics having good rigidity in which, however, the cords, due to their high flexibility, are never subjected to buckling load.

It has been determined that best results are obtained with a filler 3' of 75° Shore hardness, coupled with a reinforcement 4 made of a fabric having 4.5 cords per cm, arranged with its cords inclined at an angle of 30° with respect to the circumferential direction of the tire.

Because this filler results in the hardness being too high for the flexibility features required of the tire sidewall, it is isolated from the tire carcass fabric ply by means of a rubber filler 3" having a hardness of about 60° Shore.

The reinforcement extends thereafter in a known way, from the bead core, radially beyond the rim flange and the end of the carcass ply turn-up, up to a height between 10 and 30% of the section height of the tire.

In a wholly similar way and with the same reference numbers, FIG. 2 shows a cross section of the bead of a tire with a single metallic radial carcass.

As concerns reinforcement-filler coupling, the considerations discussed above apply but the total rigidity of the bead should, in this case, increase sensibly, even though always gradually and without discontinuity, which is obtained by way of separating filler 3' of carcass fabric plies within the lower area of the bead and contacting the bead core by means of a filler 3" of 90° Shore hardness rubber.

According to a known solution, in such a case the reinforcement can extend into the radially lower area, wrapping the bead core and, in some cases, rising for a certain extent, normally up to beyond the bead core towards the tire sidewall into the axially internal area of the bead.

In the light of the results obtained, the Applicant has then provided for the application of this metallic reinforcement to tires having double head cores and a textile radial carcass; the bead of one of such tires is shown, in its section, in FIG. 3, with the same reference numbers as used in FIG. 1.

For the sake of simplicity, the tire carcass in FIG. 3 is illustrated with only four fabric plies turned up, two by two, about the bead cores towards the outer side.

The shape of the reinforcement is the one shown by way of example in Italian Pat. No. 830,982 and the corresponding U.S. Pat. No. 3,557,860 granted Jan. 26, 1971, of the same Applicant, having a fabric strip in two folds thereof, with the fold edge corresponding to the radially internal area, with staggered ends, where the radially lower one surpasses in any case both the carcass fabric ply turn-up and the height of the rim flange. However, although maintaining the shape of the reinforcement unchanged, reinforcement fabric 4 has been replaced with the one illustrated in the previous examples, and two rubber sheets having a hardness of 75° Shore are used for fillers 3, thus surprisingly obtaining a very unexpected increase (of about 50%) of tire life.

An identical result was obtained employing, for the rubber sheets, rubber having a modulus of at 100% between 65 and 85 kg/cm².

On the other hand, equally favorable results have been obtained, as stated hereinbefore, in other various specific combinations using instead of a rubber compound having a Shore hardness between 70° an 80°, one having a modulus at 100%, between 65 and 85 kg/cm².

Although the invention has been described in detail for the purpose of illustration, it is to be understood that such detail is solely for that purpose and that variations can be made therein by those skilled in the art without departing from the spirit and the scope of the invention except as it may be limited by the claims.

I claim:

1. In a pneumatic tire for vehicle wheels, provided with a radial carcass, in which each bead comprises at least a bead core of metallic wires around which carcass fabric plies are turned up, a filler having an approximately triangular elongated section arranged on each bead core, and at least a reinforcement element arranged within the axially external area of the bead and external to the turn-up of said carcass plies, consisting essentially of a metallic cord fabric strip, radially extending from a point located at about the height of said bead core up to an external point of the rim flange and to the end of the carcass ply turn-up, said filler being constituted, at least in its portion facing said reinforcement, of a compound having a hardness between 70° and 80° Shore A; the improvement wherein said compound of hardness between 70° and 80° Shore A has a modulus at 100% (CA1) of between 65 and 85 Kg/cm²; and said reinforcement consists essentially of metallic cords of high elongation lang-lay type, the rigidity of said reinforcement resulting from the number of said cords per cm in the fabric and their angle of inclination to the circumferential direction of the tire, said angle of inclination being between 15° and 45°, whereby the rigidity of said filler throughout and the rigidity of said reinforcement are so combined with each other that they give rise to a tire bead having a constant rigidity gradient varying from point to point in a substantially continuous manner.

2. The tire of claim 1 wherein the cords of said reinforcements are 3 × 7 × 0.20 cords arranged in the fabric with 4.5 cords/cm.

3. The tire of claim 2 wherein said cords of the reinforcement are inclined at a 30° angle to the tire circumferential direction.

4. The tire of claim 1 wherein said reinforcement extends radially up to a height equal to a value between 10% and 30% of the tire section height.

5. The tire of claim 4 wherein said reinforcement wraps the said bead core extending, in an axially internal position to the carcass fabric plies, up to a radially external point with respect to said bead core.

6. The tire of claim 4 wherein said reinforcement is double, being formed by a cord fabric strip folded upon itself, with the fold edge corresponding to the radially most internal area.

7. The tire of claim 4 wherein said filler consists of two rubber sheets having an elongated section and arranged side by side and wherein the sheet facing the carcass fabric plies has a 60° Shore A hardness.

8. The tire of claim 4 wherein said filler consists of two elongated sections of a rubber sheet arranged side by side, and the sheet contacting the bead core and facing the carcass fabric plies has a 90° Shore A hardness.

9. A pneumatic tire for a vehicle wheel adapted to be installed on a rim having an annular flange, said tire comprising a bead having at least one annular wire core, a carcass comprising plies of radially disposed textile cords and integral beads which are to be disposed on the rim adjacent to the flange when the tire is mounted on the rim, at least one ply of the cords having its end turned around each of the bead cores with the turned-up portions thereof being on that side of the bead which will face the rim flange, a rubber filler disposed between the said turned-up portion of the ply and the portion of the ply disposed on the opposite side of each bead core, said filler having a Shore A 70°–80° hardness and extending radially outwardly from the end of the turned-up portion of the carcass ply with the thickness thereof gradually decreasing into a substantially pointed edge, and a metallic cord fabric disposed axially outwardly alongside the turned-up portion of the carcass ply, the metallic cords in the fabric being disposed at an angle of 15° to 45° with respect to the circumferential direction of the tire in a high elongation lang lay, and the number of cords per cm in the fabric being between three and seven, said filler and metallic cord layer being combined to provide a gradually decreasing rigidity from the bead into the sidewall of the tire.

* * * * *